United States Patent
Dworkin et al.

[11] Patent Number: 6,009,450
[45] Date of Patent: Dec. 28, 1999

[54] FINITE FIELD INVERSE CIRCUIT

[75] Inventors: James Douglas Dworkin, Chandler; P. Michael Glaser, Tempe; Michael John Torla, Chandler, all of Ariz.; Ashok Vadekar, Mississauga, Canada; Robert John Lambert, Hespeler, Canada; Scott Alexander Vanstone, Waterloo, Canada

[73] Assignees: Motorola, Inc., Schaumburg, Ill.; Certicom Corp., Mississauga, Canada

[21] Appl. No.: 08/997,943

[22] Filed: Dec. 24, 1997

[51] Int. Cl.[6] .................................................. G06F 7/00
[52] U.S. Cl. ................................................... 708/492
[58] Field of Search .................................. 708/491, 492, 708/620, 650

[56] References Cited

U.S. PATENT DOCUMENTS 5,467,297  11/1995  Zook .................................... 708/492
5,612,910  3/1997  Meyer .................................. 708/492
5,854,759  12/1998  Kaliski, Jr. et al. ................. 708/492

*Primary Examiner*—Tan V. Mai
*Attorney, Agent, or Firm*—Gregg Rasor

[57] ABSTRACT

A finite field inverse circuit has a finite field data unit (1112) and an inverse control unit (1110). The inverse control unit includes (1110) a $k_l$ and $k_u$ decrementer pair (1108, 1122), a $k_l$-$k_u$ difference unit (1106), an inverse control finite state machine (1102), and a one-bit memory (1104) coupled to the inverse control finite state machine (1102). The finite field data unit (1112) includes four m bit wide registers that are shift registers designated as B (1120), A (1118), M (1114), and C (1116), where B- is a first register, A- is a second register, M- is a irreducible polynomial register, and C- is a field element register. An the irreducible polynomial is loaded left justified in the M-register, a field element to be inverted is loaded left justified in the C-register, and a single "1" is loaded in an LSB bit of the B-register. The field element is then inverted in 2n+2 system clock cycles where n is a field size associated with the field element.

14 Claims, 12 Drawing Sheets

FINITE FIELD INVERSE CIRCUIT

FIELD OF THE INVENTION

The present invention relates to a method and apparatus for performing finite field and integer arithmetic.

BACKGROUND OF THE INVENTION

Elliptic Curve (EC) cryptography over a finite field require arithmetic operations of addition, multiplication, squaring and inversion. Additionally, subtraction operations are also required if the field is not of characteristic two. Modular arithmetic operations are also required, for example in computing signatures, however these operations are required less frequently than the finite field operations. EC cryptography as an example, requires the full complement of modular operations, addition, subtraction, multiplication and inversion.

Field sizes for cryptography tend to be relatively large, requiring fast, dedicated processors to perform the arithmetic operations in an acceptable time. Thus there have been numerous implementations of either fast modular arithmetic processor or dedicated processors for performing arithmetic operations in $F_2^m$.

Traditionally RSA was the encryption system of choice, however with the advent of superior and more secure EC cryptography the need for processors that perform modular exponentiation exclusively is becoming less imperative. Thus while users are in transition from RSA cryptography to EC cryptography there is a need for an arithmetic processor that supports both these operations, with little or no penalty in performance.

SUMMARY OF THE INVENTION

It is an object of the invention to provide a processor that combines finite field arithmetic and integer arithmetic and for providing operations required for EC cryptography.

It is a further object of the invention to provide an arithmetic processor design that may be scaled to different field or register sizes.

A still further object of the invention to provide an arithmetic processor that may be used with different field sizes.

A still further object of the invention is to provide an arithmetic processor that is capable of being scaled to provide an increase in speed when performing multi-sequence operations by simultaneously executing multiple steps in the sequence.

In accordance with an embodiment of the invention there is provided an arithmetic processor that performs both finite field arithmetic and integer arithmetic and in which both special purpose registers and general purpose registers, and arithmetic circuits, are shared. For this purpose, a polynomial basis for the finite field hardware will be assumed, since this basis is similar to the standard radix-power basis of the integers.

In accordance with a further embodiment of the invention, there is provided a processor that includes finite field circuitry and integer arithmetic circuitry and which includes general-purpose registers, and special-purpose registers, wherein the special-purpose registers are not shared by the arithmetic circuitry.

In accordance with this invention there is provide an arithmetic processor comprising: finite field arithmetic circuitry; integer arithmetic circuitry; and mode control means for selectively enabling either the finite field circuitry or integer arithmetic circuitry.

BRIEF DESCRIPTION OF THE DRAWINGS

Embodiments of the invention will now be described by way of example only with reference to the accompanying drawings in which.

DESCRIPTION OF A PREFERRED EMBODIMENT

Figure 1:
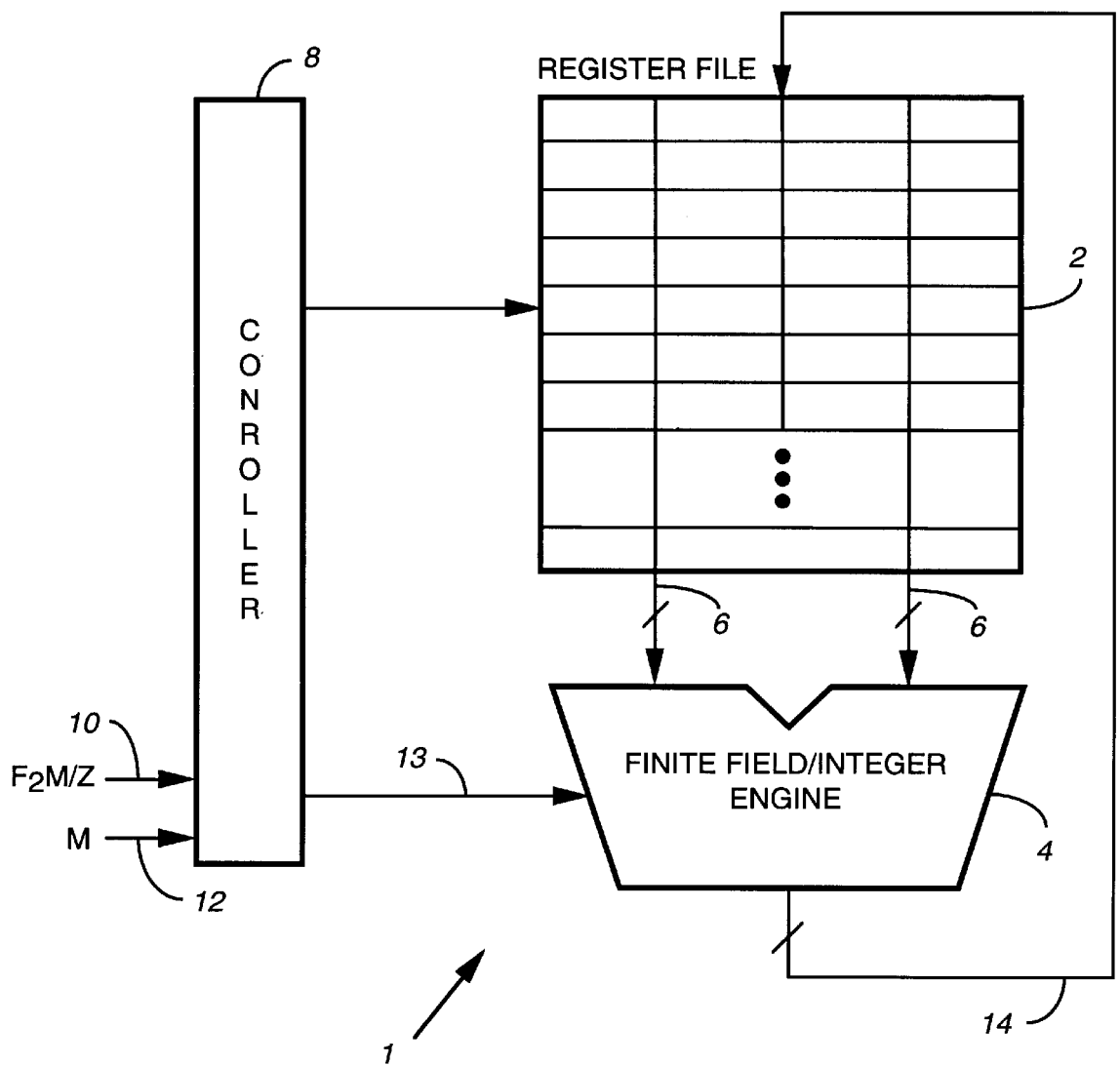
FIG. 1 is a block diagram of an arithmetic processor architecture for performing finite field arithmetic and integer arithmetic.

Referring to FIG. 1, an embodiment of an arithmetic processor is shown generally by numeral 1. The arithmetic processor includes a group of general purpose registers 2, termed a register file (which may be used as intermediate storage for EC point additions, point doublings, etc.), which communicate with an arithmetic-logic unit (ALU) 4, via data input buses 6. The ALU 4 includes shared finite field and integer arithmetic circuitry. A data output bus 14 is provided from the ALU 4 to the register file 2 for writing results of computations performed in the ALU 4 to the register file 2. Computational operations of the ALU 4 are controlled via micro-programmed instructions residing in a controller 8 section of the arithmetic processor 1. A mode selection control 10 is provided to select between either finite field computations or modular integer computations. A field size control 12 is also provided for initializing the ALU 4 to accommodate different operand vector sizes. Thus the controller 8 performs the following tasks amongst others: provides the appropriate arithmetic mode and operation to the ALU 4; coordinates data access between the register file 2 and the ALU 4; and provides to the ALU 4 the appropriate field size to be used. The general-purpose registers are chosen to have a width large enough to handle at least the largest foreseeable $F_2^m$ EC cryptosystem. The registers may be combined to support larger lengths required for integer modular arithmetic. For example if a single register in the register file 2 is 512 bits wide, then four registers may be used to provide storage for a single 2048-bit RSA quantity.

Figure 2:
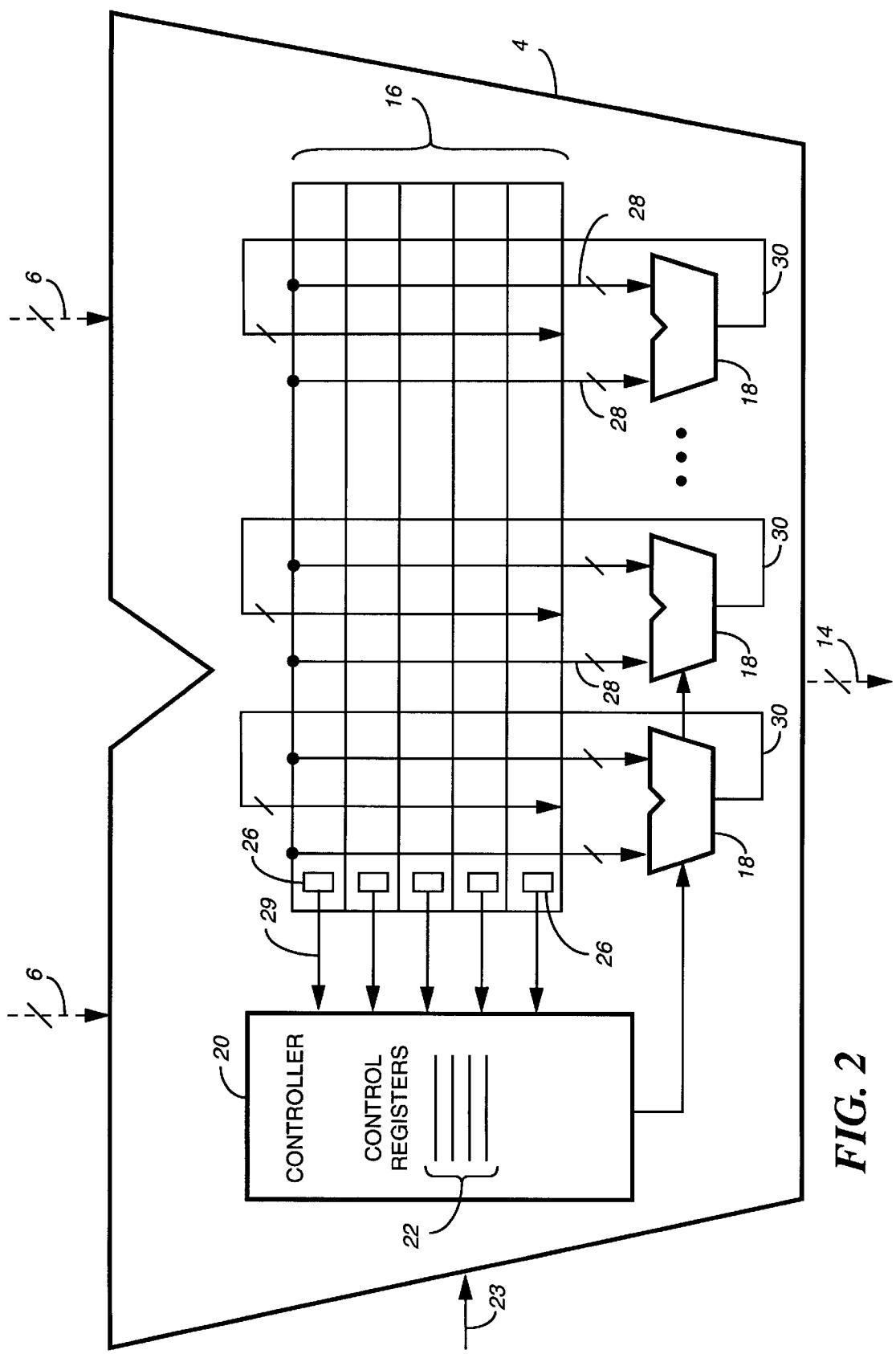
FIG. 2 is a block schematic diagram of the ALU shown in FIG. 1.

Turning now to FIG. 2, the ALU 4 includes several special purpose registers 16, combinatorial logic and arithmetic circuitry contained in a plurality of sub-ALU's 18, input data buses 28 to each of the sub ALU's from the special purpose registers; output data buses 30 to the special purpose registers 16 from the sub ALU's 18 and its own controller 20. The controller 20 performs the following tasks amongst others: sequences the ALU 4 through steps in a computational operation; monitors control bits from the special purpose registers 16; and implements a counter in its own control registers 22 for determining the size of a field being used, a feature which allows the processor 1 to be used for different field sizes without having to redesign the processor hardware. In order to provide these functions, the control bits 26 of the special purpose registers 16 are provided as control bit inputs 24 to the controller 20. The special purpose registers 16 are all individually addressable. The controller 20 also controls data input via the input buses 6 from and to the register file to the sub ALU's 16 or the special purpose registers 16. Each of these components will be described in more detail below.

Figure 3:
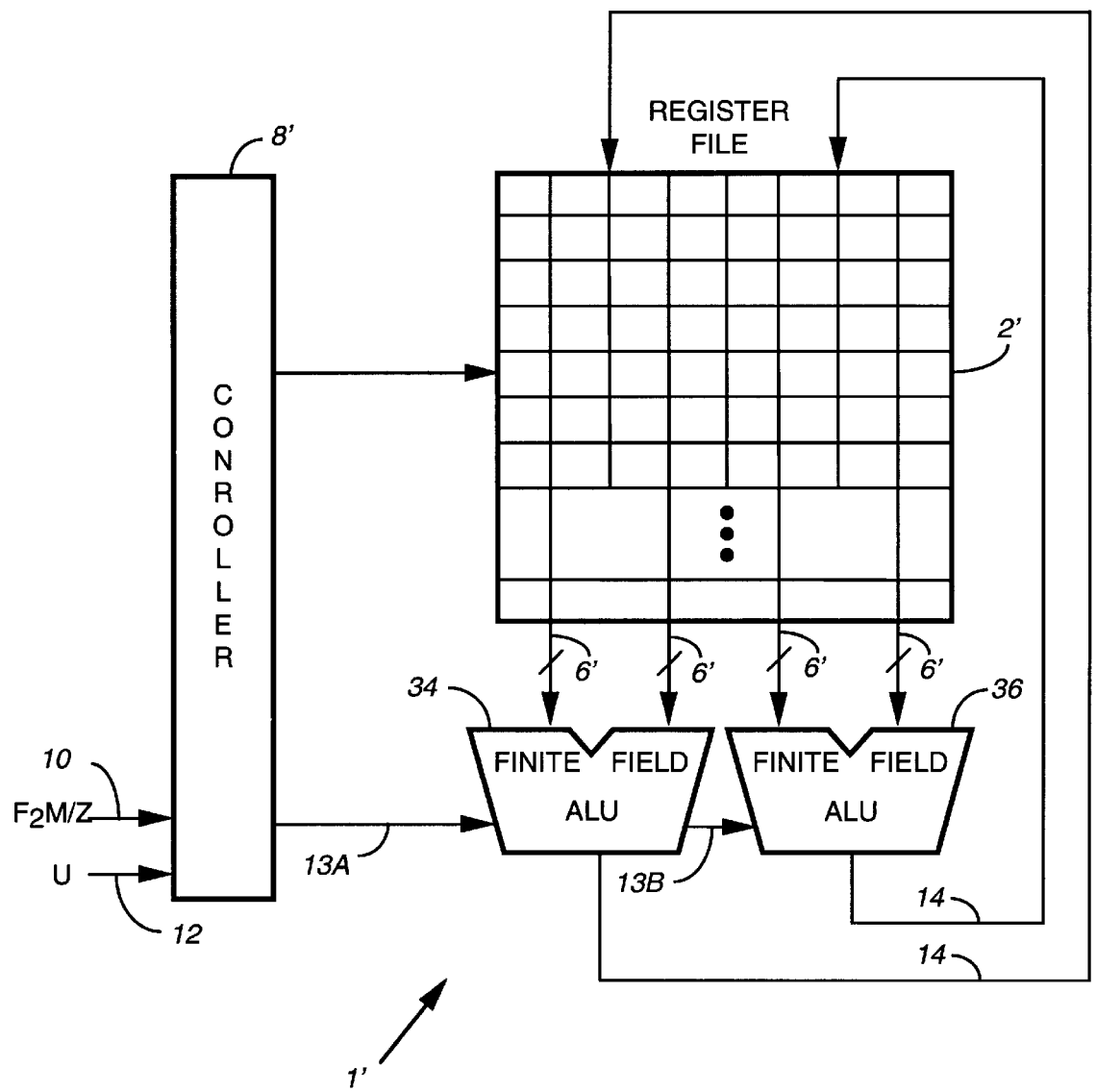
FIG. 3 is a block diagrams of an alternative embodiment of an arithmetic processor architecture for performing finite field arithmetic and integer arithmetic.

Referring to FIG. 3, an alternative embodiment of an arithmetic processor is shown generally by numeral 1'. In this embodiment a separate finite field unit 34 and integer modular arithmetic unit 36 is provided. This processor also includes a register file 2', data input buses 6', data output buses 14', and a controller 8' however separate controls 13a and 13b are provided from the controller 8' to respective ALU's 34 and 36 respectively.

Figure 4:
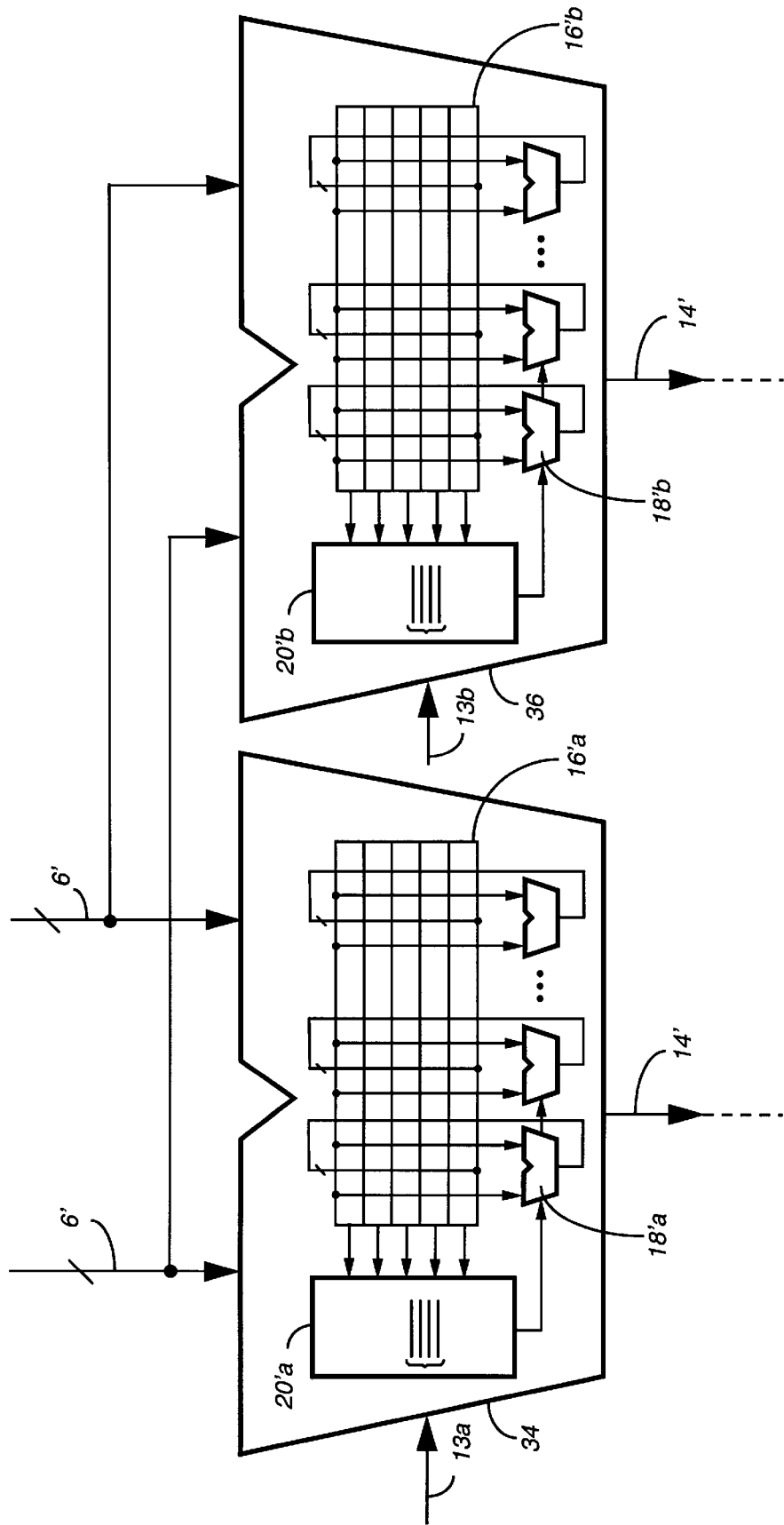
FIG. 4 is a block schematic diagram of the ALU shown in FIG. 3.

Referring to FIG. 4, the ALU's 34 and 36 of FIG. 3 are shown in greater detail. Each of the ALU's 34 and 36 include their own respective special-purpose registers 16'a and 16'b and controller 20'a and 20'b. Each of the ALU's 34 and 36 contain their own sub ALU's 18'a and 18'b respectively. Thus it may be seen that in this embodiment special purpose registers 16'a and 16'b and arithmetic and control circuitry is not shared. One or more of the sub ALU's 18'a perform the functions of Shift left/right, XOR-shift and one or more of the sub ALU's 18'b perform the function of integer add and integer subtract.

Referring back to FIG. 2, the sub ALU's 18 perform the following logical functions on operands provided from the special purpose registers 16: XOR; Shift left/right, XOR-shift, integer add and integer subtract. These functions may be contained in one sub ALU 18 or across multiple sub ALUs. By providing multiple sub ALU's 18 the processor is capable of performing multiple operations, (e.g. for finite field inversion), simultaneously.

Figure 5:
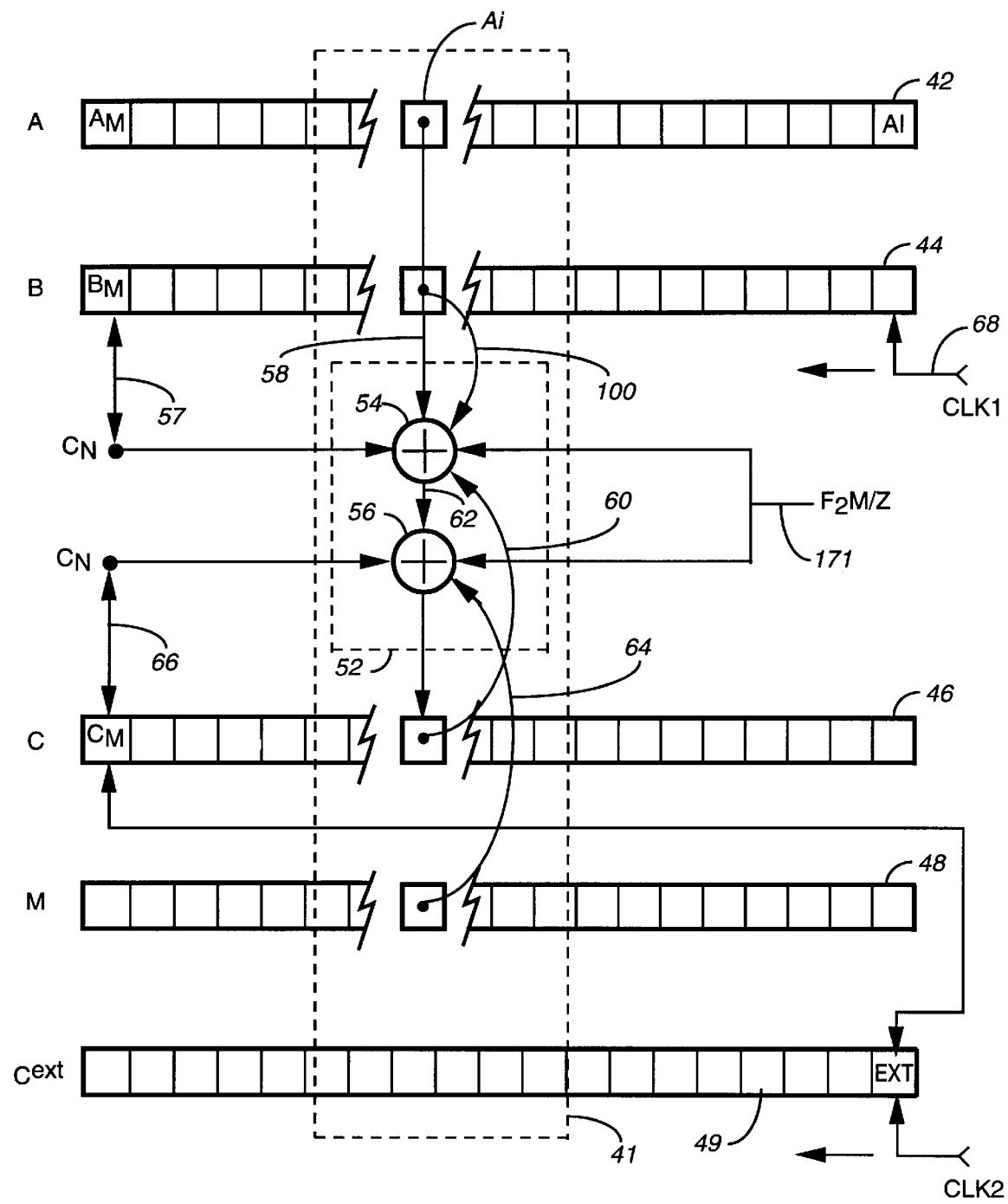
FIG. 5 is a block diagram of an embodiment of a bit-slice of the ALU shown in FIG. 2.

Turning now to FIG. 5, a bit-slice 41 of the ALU 4 shown in FIG. 2 is shown in greater detail. In the following discussion, we shall refer to the interconnection of cells of respective special-purpose registers in conjunction with its associated logic circuitry as a bit-slice 41. The logic circuitry contained in a bit slice is generally represented schematically by one of the sub ALU's 18. It is then intended that the configuration of a bit slice may be repeated M times for an M-bit register. Furthermore, for clarity, we define M to be the number of cells in a register, and we refer to individual cells in a register as, for example, $A_i$ where $1 \leq i \leq M$ and wherein $A_M$ is the right most cell of the special-purpose register. The contents of a register will be referred to by lower case letters, for example, a bit vector of length m will have bits numbered from $a_0 \ldots a_{m-1}$ with $a_0$ being the LSB. It may also be noted that although the special-purpose registers have been given specific names, these registers may take on different functions depending on the arithmetic operation being performed as will be described below.

In FIG. 5, the special-purpose registers 16 include: a pair of operand registers A 42 and B 44, to hold for example the multiplicand and multiplier, respectively, in a multiplication operation; an accumulator register C 46; a modulus register M 48; and a carry extension register $C^{ext}$ 50. The registers each have M cells for holding the respective binary digits of bit vectors loaded therein. It is preferable that these registers are shift registers. A sub ALU 18 shown in FIG. 2 may be implemented by the circuitry of block 52 in FIG. 5, and in a manner to be described below.

Operation of the ALU 4 may be best understood by reference to a specific arithmetic operation such as finite field multiplication. Consider the product C of two elements a and b, where a and b are bit vectors and wherein b will be of the form $b=(b_0, \ldots b_{n-1})$ in polynomial basis representation and a will be of the form $a=(a_0, \ldots a_{n-1})$ in polynomial basis representation. A modulus bit vector m has the form $m=(m_0, \ldots m_n)$. In $F_2^m$, the multiplication may be implemented as a series of steps, which is more clearly set out by the following pseudo-code:

```
C = 0
For i from n-1 to 0 do
    For j from n-1 to 0 do        {
        c_j = c_{j-1} + b_i(a_i) + c_{n-1} (m_j)
        c_{-1}=0
    }
```

In performing the multiplication, partial products of the multiplicand and each of the bits of bi of the multiplier, proceeding from the most significant bit (MSB) to the least significant bit (LSB), are formed. The partial products are reduced by the modulus if the MSB of the previous partial product is set.

Multiplication may be implemented by sequentially using a 1×M multiplier. The modulus register M is loaded with the modulus bit vector M stripped of its most significant bit $m_n$ such that each cell contains a respective one of the binary digits $m_i$. In the implementation shown, the bits $m_i$ is arranged from left to right with the MSB of the vector being the leftmost bit, i.e. cell $M_M$ contains bit $M_{n-1}$. The shift registers A and B are loaded with the finite field elements bit vectors a and b respectively so that each cell contains one of the binary digits $a_i$ or $b_i$. The finite field elements a and b are also stored left justified, and in reverse order, in their respective registers so that the topmost bit of the multiplier register b is always available at the left boundary cell bit, i.e. $(a_{n-1}, a_{n-2}, \ldots a_0)$ and $(b_{n-1}, b_{n-2}, \ldots b_0)$. If the length of the vectors a and b are less than the length of the registers; the remaining cells are padded with zeros. The above is generally performed by the controller 20 shown in FIG. 2. Other arrangements of sequential multiplication are possible (such as sequentially reducing the multiplicand), but such arrangements do not allow flexible field sizes along with fixed control bit locations. Bit ordering from LSB to MSB is also possible with corresponding changes in the multiplication algorithm.

A bit-slice 41 of the ALU 4 for implementing multiplication in a finite field is now described. The bit-slice 41 includes first and second controllable adders 54 and 56, respectively, each having an XOR function. The topmost cell $B_M$ of the register B provides an add control signal $b_m$ 57 to the first adder 54. Inputs 58 and 60 to the first adder 54 are derived from a register cell $A_i$ and accumulator cell $C_i$. An output 62 from the first adder 54 is connected to an input of the second adder 56 along with an input 64 from the modulus register cell $M_i$.

The output from the second adder 56 is then connected the accumulator cell $C_i$. A second add control signal 66 is derived from the topmost cell $C_M$ of the accumulator C 46. It may be seen that this signal implements the modular reduction of the partial product in the accumulator C by the modulus vector m, when the topmost bit $C_M$ of C is set. The B register is a clocked shift register. A clock signal CLK1 68, which may be provided by the controller 20 causes the contents of this register to be shifted left for each partial product, calculated.

Figure 6:
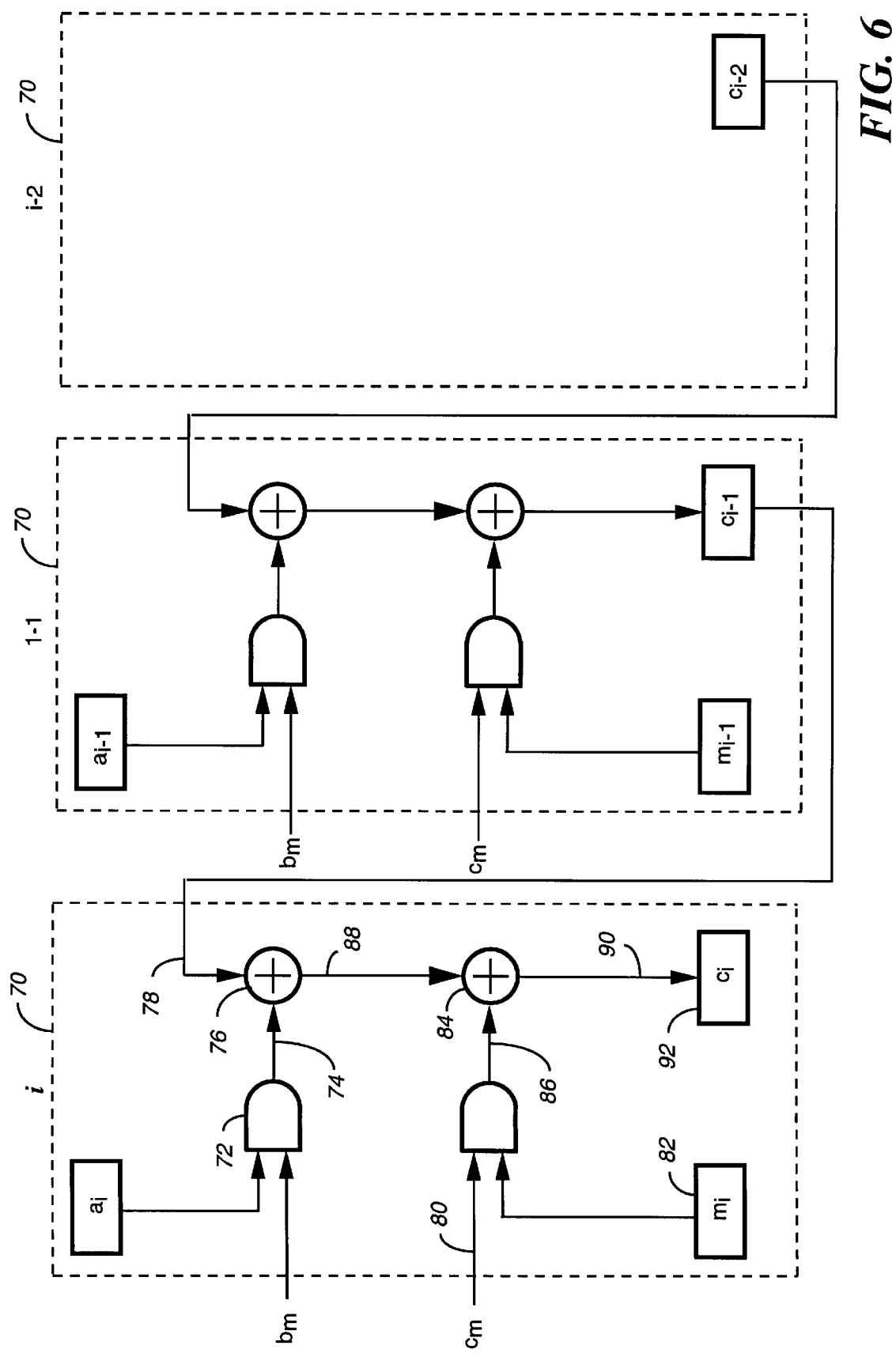
FIG. 6 is a circuit diagram of a finite-field multiplier of the bit-slice shown in FIG. 5.

Referring to FIG. 6, a detailed circuit implementation of the bit-slice 41 of FIG. 5 for finite field multiplication is indicated by numeral 70. Referring to bit-slice i, 70 of FIG. 6, (only three bit-slices are shown for the purpose of illustration in FIG. 6), the cell $a_i$ is ANDed with the add control signal $b_m$ by an AND gate 72. The output 74 of the AND gate 72 is connected to an input of an XOR gate 76 along with an input 78 from adjacent cell $C_{i-1}$ of the accumulator C. Thus implementing the calculation of the term "$c_{j-1}+b_i(a_i)$." The term "$c_{n-1}(m_j)$" is implemented by ANDing the signal $c_n$ 80 with $m_i$ 82 utilizing an AND gate 84. The output 86 of the AND gate 84 is connected to the input of an XOR gate 84, along with the output 88 of XOR gate 76. The output 90 of XOR gate 84 is connected to cell $C_i$ 92. Thus implementing the expression "$c_j=c_{j-1}+b_i(a_i)+c_{n-1}(m_j)$." With this general sequential multiplier, the product of two n-bit finite field elements will be produced in n clock cycles. It is preferable that a synchronous counter, that may be contained in the controller 20, provides control of the number of iterations.

Addition

Although the circuitry has been described with reference to multiplication in a finite field $F_2^m$, other computational operations may also be performed with ease. Finite field addition has an advantage over integer arithmetic in that no carries are produced. The computation of a finite field sum requires only that an XOR gate be introduced at each cell of the registers in question since addition of two elements a and b in a finite field is simply a EXOR b. Thus, referring back to FIG. 5, an input 100 is provided to the first adder 54 from cell $B_i$, and the second adder 56 may be bypassed. The output from adder 54 is then written directly into cell $C_i$. After the operands have been moved into registers a and b, the addition can be performed in a single clock cycle. It is also possible for the operation to be performed in the ALU and the result written back into a general register in the register file.

Squaring

Squaring a number can be performed in the same time as multiplication of two different numbers. Squaring in a polynomial basis can be performed in a single clock cycle, if the specific irreducible along with the squaring expansion is explicitly hardwired.

Inversion

Inversion of finite field elements in $F_2^m$ may be performed using the extended Euclidean algorithm and utilizing four of the special purpose registers with additional control logic. This will be completed in 2n cycles if the shifting is made concurrently to the adds (which is easily implemented by hard wiring the outputs of the add to the next register cell).

Figure 7:
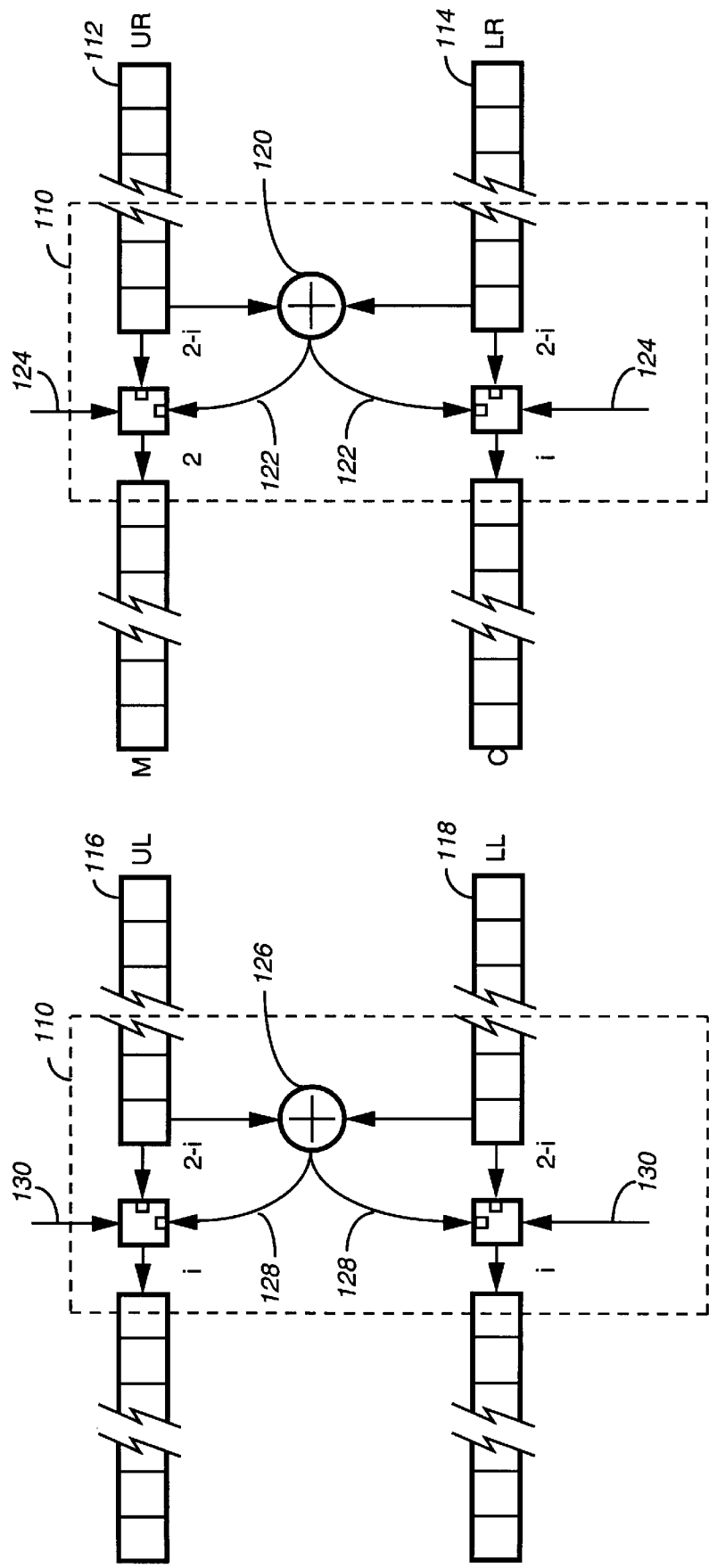
FIG. 7 is a block diagram of an arithmetic inverter.

The registers used in the inversion are A, B, M and C. For convenience these registers are schematically shown in FIG. 7 wherein they are assigned the following labels: A:UL; B:LL; M:UR; and C:LR. Once again the operation may be described with reference to a bit-slice 110.

The operands in an inversion are generally: an element to invert g; an irreducible polynomial f or modulus m; a bit vector "0" and a bit vector "1." The UL register 116 is loaded with f or m. The LL register 118 is loaded with g, the UR register 112 is loaded with "0" and the LR register 114 is loaded with "1." For the UR and LR registers 112 and 114, respectively, cells $UR_i$ and $LR_i$ are XORed together by XOR gate 120 to produce an output 122. A control signal 124 determines whether one of three possible inputs is written in cell $UR_i$ and $UL_i$. The inputs are either a left or right shift from adjacent cells or the output 122. The control signal B determined by the state table to be described below. For the UL or LL registers 116 and 118, respectively, cells $UL_I$ and $LL_I$ are XORed together by XOR gate 126 to produce an output 128. A control signal 130 determines whether one of two possible inputs is written into cell $UL_i$ and $LL_i$. The inputs are either a left shift from the adjacent cell (i−1) or the output 128. Once again the control signal 130 is determined by the state table to be described below.

If we assume the control variables to be $k_u$—the length of the U registers and $k_l$—the length of the L registers. Then $\Delta=k_u-k_l$. The values $k_{l \, and \, ku}$ are implemented with synchronous countdown counters, and $\Delta$ is implemented with a synchronous up/down counter. Counter registers $k_u$, $k_l$ and $\Delta$ are also provided. The UL and LL registers are left shift registers while the UR and LR registers are both left and right shift registers.

Furthermore, for the count registers, $\Delta$ is loaded with 0, $K_u$ is initialized to M. A control bit latch provides a toggle function wherein a "1" designates an up count and a "0" designates a down count. The U/D control is initially set to "1." Then a sequencer contained in the controller for performing the inversion in the ALU has the following outputs:

deckl . . . Decrement $K_l$ decku . . . Decrement $K_u$ decDelta . . . Decrement $\Delta$ incDelta . . . Increment $\Delta$ toggle . . . Toggle UP/DOWN lsUL . . . left-shift Upper Left register lsLL . . . left-shift Lower Left register lsUR . . . left-shift Upper Right register lsLR . . . left-shift Lower Right register rsUR . . . right-shift Upper Right register rsLR . . . right-shift Lower Right register outLR . . . Output Lower Right register outUR . . . Output Upper Right register dadd-lsLL . . . Down XOR and left-shift Lower Left register uadd-lsUL . . . Up XOR and left-shift Upper Left register

TABLE 1

A state table outlining the action of the inverter follows as TABLE 2, wherein $M_u$ and $M_l$ are the upper bit of registers UL and LL respectively and wherein $M_u$ and $M_l$ determine the current state. When an action is performed on the registers and counters which places the inverter in a new state. The process is repeated until either $K_u$ or $K_l$ are zero and one of the right register RL or RU will contain $g^{-1}$.

TABLE 2

| U/D | $K_u$ | $K_l$ | $\Delta$ | $M_u$ | $M_l$ | Action |
|---|---|---|---|---|---|---|
| X | 0 | X | X | X | X | OutLR |
| X | X | 0 | X | X | X | OutUR |

TABLE 2-continued

| U/D | $K_u$ | $K_1$ | Δ | $M_u$ | $M_1$ | Action |
|---|---|---|---|---|---|---|
| 1 | $\bar{0}$ | $\bar{0}$ | 0 | 0 | 1 | $Deck_u$ dec Δ lsUL lsURtoggle |
| 1 | $\bar{0}$ | $\bar{0}$ | $\bar{0}$ | 0 | 1 | $Deck_u$ dec Δ lsUL rsLR |
| 0 | $\bar{0}$ | $\bar{0}$ | X | 0 | 1 | $Deck_1$ dec Δ lsUL lsUR |
| 0 | $\bar{0}$ | $\bar{0}$ | 0 | 1 | 0 | $Deck_1$ inc Δ lsLLlsLR toggle |
| 0 | $\bar{0}$ | $\bar{0}$ | $\bar{0}$ | 1 | 0 | $Deck_1$ inc Δ lsLLrsUR |
| 1 | $\bar{0}$ | $\bar{0}$ | X | 1 | 0 | $Deck_1$ inc Δ lsLLlsLR |
| 0 | $\bar{0}$ | $\bar{0}$ | 0 | 1 | 1 | $Deck_1$ inc Δ Dadd-lsLL lsLR toggle |
| 0 | $\bar{0}$ | $\bar{0}$ | $\bar{0}$ | 1 | 1 | $Deck_1$ inc Δ Dadd-lsLL rsUR |
| 1 | $\bar{0}$ | $\bar{0}$ | 0 | 1 | 1 | $Deck_u$ dec Δ Uadd-lsUL lsUR toggle |
| 1 | $\bar{0}$ | $\bar{0}$ | $\bar{0}$ | 1 | 1 | $Deck_u$ dec Δ Uadd-lsUL rsLR |

Integer Arithmetic

The extreme similarity of polynomial and integer representations for allows for the sharing of hardware in the ALU. For addition, the integer arithmetic is only complicated by the requirement for carries. The integer arithmetic operations of the ALU are best illustrated by way of example utilizing a multiplication operation.

Multiplication in Z is illustrated by way of reference to the following sequence of steps represented in pseudo-code, wherein as earlier, a and b are bit vectors to be multiplied and c is the product of a and b, and wherein $c=(c_0, c_1, \ldots c_{n-1})$.

```
C=0
M=0
For i from 0 to n-1 do
    C^ext ← C
    For j from 0 to n-1 do
        cj = (b_i(a_j) + m_j + c_j) mod 2
        m_j + 1=(b_j(a_j) + m_j + c_j) / 2
And where
        C^ext ← C: For j from n-1 to 0 do
            c_{j-1} = c_j
            c_{j-1}^{ext} = c_j^{ext}
```

It may be observed that the bit-slices 70 for finite field multiplication illustrated in the embodiment of FIG. 6, may be modified to include multiplication for integer representations. It may also be noted that for integer multiplication, the registers are loaded with the bit vectors in reverse order i.e. the leftmost cell of a register contains the LSB of the bit vector. In integer number multiplication, it is necessary to implement carries between successive partial products, furthermore as the partial products are not being reduced by a modulus the carries from the addition of successive partial products must be provided for. Thus the accumulator register C is extended and a new register $C^{ext}$ 49 is provided as shown in FIG. 5. Before each partial product is formed, the lowest bit of the accumulator C (cell $C_M$) is shifted into the topmost bit of the extension register $C^{ext}$ (cell $C^{ext}_{-1}$) and then both the accumulator C and $C^{ext}$ are shifted toward the LSB by one bit. The final result is obtained in C and $C^{ext}$ wherein $C^{ext}$ contains the low order bits of the product. This is represented by the operation $C^{ext} \leftarrow C$ above.

Figure 8:
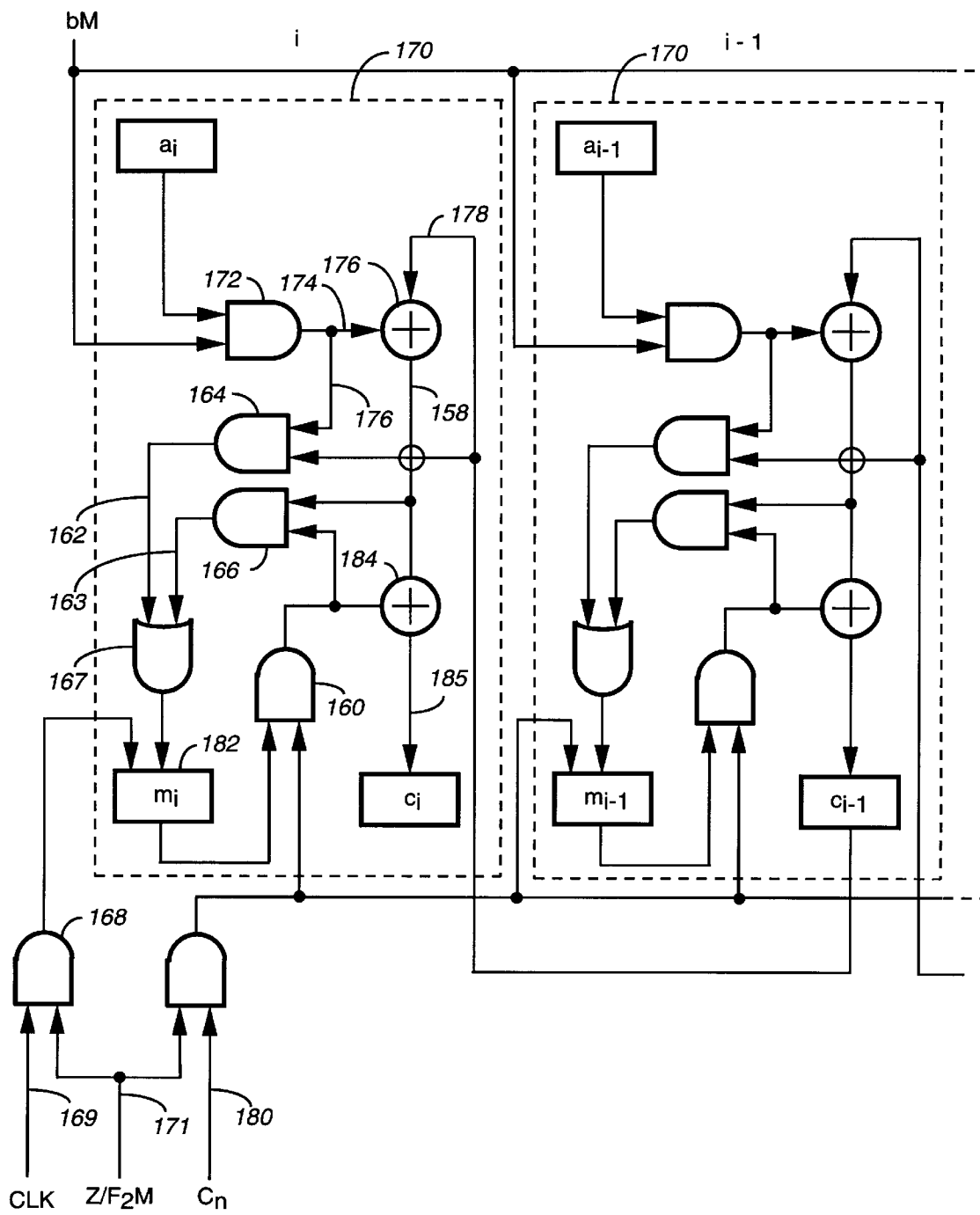
FIG. 8 is a circuit diagram of a combined finite-field/integer multiplier.

Referring now to FIG. 8, a bit-slice 170 is shown, and which is similar to the bit-slice 70 of FIG. 6. Accordingly the reference numerals used in the description of FIG. 6 will be used to identify like components with a prefix 100 added i.e. reference numeral 70 will become 170. The arrangement of FIG. 8 differs from FIG. 6 in two important ways; the modulus register m is used as a carry register, and a mode selection signal $Z/F_2^M$ 171 is provided.

Now the terms $c_j = c_{j-1} + b_i(a_i) + c_{n-1}(m_j)$ are implemented as before for the finite field multiplication with the product of the control signal $b_m$ and the contents of register cell $A_i$, implemented by AND gate 172. The output 174 of the AND gate 172 is XORed with the contents of register cell $c_{j-1}$ by XOR gate 176 to produce an output term $c_{j-1} + b_i(a_i)$ indicated by numeral 158. This output signal is XORed using XOR gate 184 with the term "$c_{n-1}(m_j)$" indicated by numeral 185, derived from the AND gate 160 to produce the term $c_j$. In addition, a carry term $m_i$ is produced from the sum of the respective products "$b_i(a_i) \cdot c_{j-1}$" 162 and "$(c_{j-1} + b_i(a_i)) \cdot (m_j)$" 163 and written into cell $m_i$ 182. The product terms 162 and 163 are implemented by AND gates 164 and 166 respectively. The sum of the terms 162 and 163 are implemented by OR gate 167.

The mode selection signal $Z/F_2^M$ 171, is ORed with the carry input signal $c_n$ 180 and is also ANDed 168 with clock signal 169. Thus by setting $Z/F_2^M = 0$, will implement finite field arithmetic and by setting $Z/F_2^M = 1$ will implement integer arithmetic.

Thus the modifications necessary to convert the finite field multiplier given previously in FIG. 6 into a combined finite field/integer multiplier are shown in FIG. 8. Note that the output register C is extended to collect the low order bits of the multiplication. As computations in Z are performed without a modulus, the modulus register M is not used to reduce the partial products but as a holder of the carries. The control signal $Z/F_2^M$ 171 enables the integer multiplication circuitry for the ALU.

A final carry propagation may be provided by a Manchester ripple chain, possibly extended by a carry-skip mechanism of one or two layers owing to the long register length. It is also possible to clock for n more cycles, allowing the carry save adders to completely merge the carries.

Two's complement subtraction can be implemented in the carry propagation adder provided that one input can be conditionally complemented at its input and that a "hot" carry-in is made at the LSB of the adder.

When multiplying, the ripple-carry will be intolerable even if improved by the carry-skip, but this carry propagation can be almost entirely removed by using a carry-save adder, which provides a redundant representation of the partial product, which is only resolved after the multiplication is complete.

Figure 9:
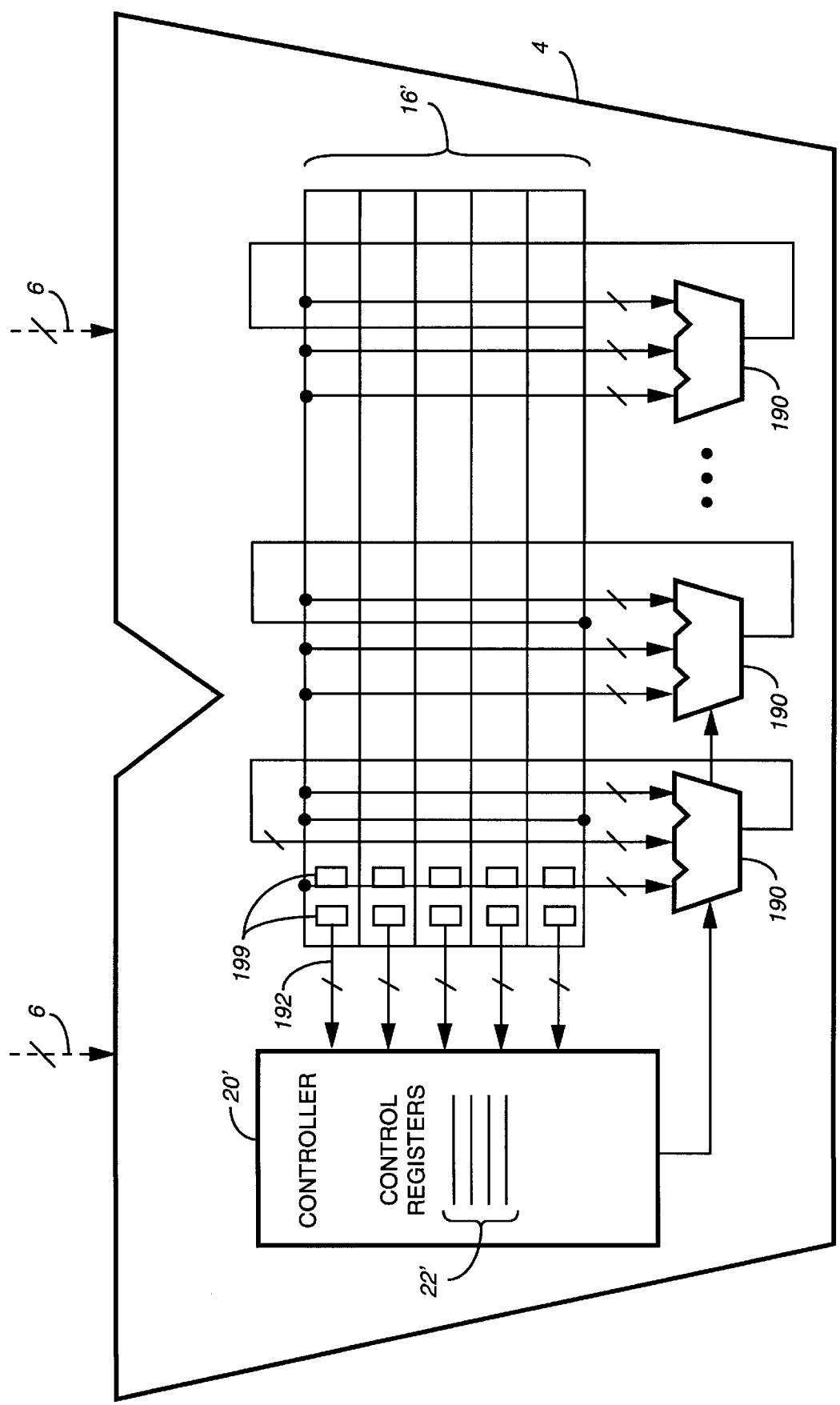
FIG. 9 is a block schematic diagram showing an embodiment of a multi-bit ALU of FIG. 1.

In a further embodiment the ALU 4 may be modified to provide a linear increase in computation speed as shown in FIG. 9. This is achieved by processing consecutive bits from the special-purpose registers 16' at once, and implementing additional circuitry indicated by the modified sub ALU's 190 to process the incremental additions as schematically illustrated in FIG. 9. Processing multiple bits then results in a linear increase in speed. For example, where a computation is performed sequentially two or more steps in the sequence may be performed simultaneously. In this case the controller 20' will process two or more control bits 194 from the special-purpose registers 16', and the inputs 192 to the controller are indicated in FIG. 9 as multi-bit lines.

Figure 10:
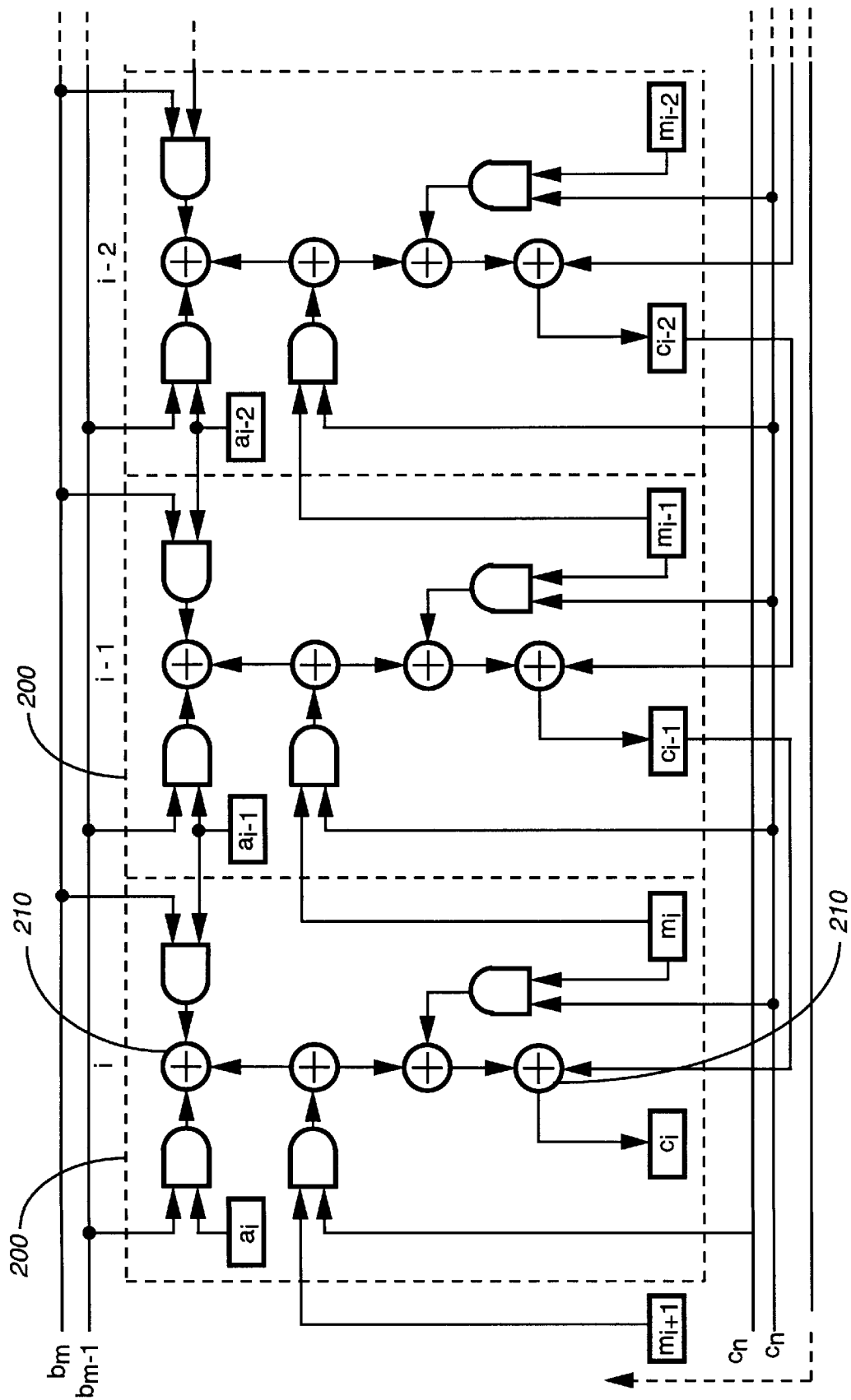
FIG. 10 is a circuit diagram of the multi-bit finite-field multiplier of FIG. 9.

A circuit diagram of a two-bit at a time multiplier for finite fields is shown in FIG. 10. In this implementation, the bit-slices 200 have twice the number of XOR gates 210, implementing two terms of the addition, the circuit takes two bits of multipliers and adds in two adjacent shifts of the multicand $a_i$ and $a_{i-1}$, and reduces with two adjacent shifts of the modulus $M_i$ and $M_{i-1}$. This has the effect of simultaneously producing two consecutive partial products with modulus reduction, thus halving the total computation time.

It should also be noted that the top-bits of the special-purpose registers are used as control bits for the controllers 20' or 20. This has the advantage that when the operands are loaded into the registers, they are aligned left; thus control is always obtained from a fixed bit location. However, other bits may be used as a control bits, e.g. the bottom bits; however, this may additionally increase the complexity of the hardware.

Again, multi-bit operation potentially providing improved linear increase in computation speed, since such options as Booth (or modified-Booth) recoding become possible.

It is assumed that the ALU will also be able to perform simple arithmetic operations on general registers. An alternative is to have all arithmetic performed on ALU internal registers, with the general-purpose registers able only to read and write these registers.

The functionality of the ALU will include integer addition, utilizing some carry propagation method, such as a ripple carry or the combination of carry skip addition and carry completion.

The ALU will also provide simple XOR functionality for use in finite field addition. Since the integer and finite field representations (bit orders) are reversed, it is beneficial to provide a bit reversal mechanism for use in field to integer and integer to field conversions. The tops of two shift registers are connected to provide for this facility in n clock cycles, where n is the length of the arithmetic operands.

The general architecture given here has the potential not only to share the register file between EC and modular exponential arithmetic, but also to share special purpose registers and even combinational logic, in addition to shared control registers.

Maore particularly, the present invention comprises a circuit and method for calculating the inverse of finite field elements over the field $F(2^m)$ in the polynomial basis. A finite field that contains $2^m$ elements is conveniently represented in a binary element containing m bits. A finite field element is any collection of m bits, where each bit can be either 0 or 1. The m bits of the finite field element can represent any of a number of things, depending on the specific implementation of the system. Two possible examples are integers and polynomials.

An integer represented in binary is a representation well known in the art. Much like the base 10 (decimal) system, integers are represented in base 2 (binary) as well. For example, the decimal number 12 is represented in binary as the string of bits "1100". The least significant bit holds the 1's place. The next bit holds the 2's place. The next bits hold the 4's and 8's place, respectively. This particular finite field contains 4 bits, thus the field contains a maximum of $2^4=16$ elements. It is commonly understood that a 4-bit binary integer can range from 0 to 15. A mathematical way to represent this exemplary finite field is shown below.

$$12 = 1100 = 1*(8) + 1*(4) + 0*(2) + 0*(1)$$
$$= 1*(2^3) + 1*(2^2) + 0*(2^1) + 0*(2^0)$$

A collection of m bits can also represent a polynomial, where the bits are the ordered set of coefficients of the polynomial. For example, the 3-bit polynomial $(x^2+1)$ can be represented by (101). Since the finite field element is a collection of binary bits (called "characteristic 2"), the coefficients of the polynomial must be 0 or 1. Mathematical functions like addition and multiplication are defined over polynomials just as they are for integers. Addition of two polynomials is very easy, especially if the coefficients are limited to the values 0 and 1. In the example shown below, all coefficients are reduced modulo 2, since the finite field has characteristic 2.

First, consider the following polynomials:

$$(x^2+x+0)+(0+x+1)=(x^2+2x+1)=(x^2+0x+1)=(x^2+1)$$

These polynomials may be represented in binary fields as follows:

$$(1\ 1\ 0)+(0\ 1\ 1)=(1\ 2\ 1)=(1\ 0\ 1)=(x^2+1)$$

Notice that the result of (A+B)=(A XOR B). Thus, addition of polynomials in characteristic 2 is equivalent to a bitwise XOR.

Inversion can be looked at in the following manner. Given an integer, denoted "c", the inverse of that value, "$c^{-1}$", is another integer which, when multiplied by "c", returns the identity element. That is, $$c \times c^{-1} = 1$$

In real numbers, the inverse of 5 is ⅕, since (5×⅕)=1, and 1 is the identity element. For finite fields in polynomial basis, however, computing the inverse is non-trivial. For a field element "c", we must find "$c^{-1}$", where:

$$(c \times c^{-1})\ \text{mod}\ m=1, \text{where m is the irreducible polynomial}$$

The present invention allows the computation of a finite field inverse to occur in (2n+2) cycles, where n is the field size.

Figure 11:
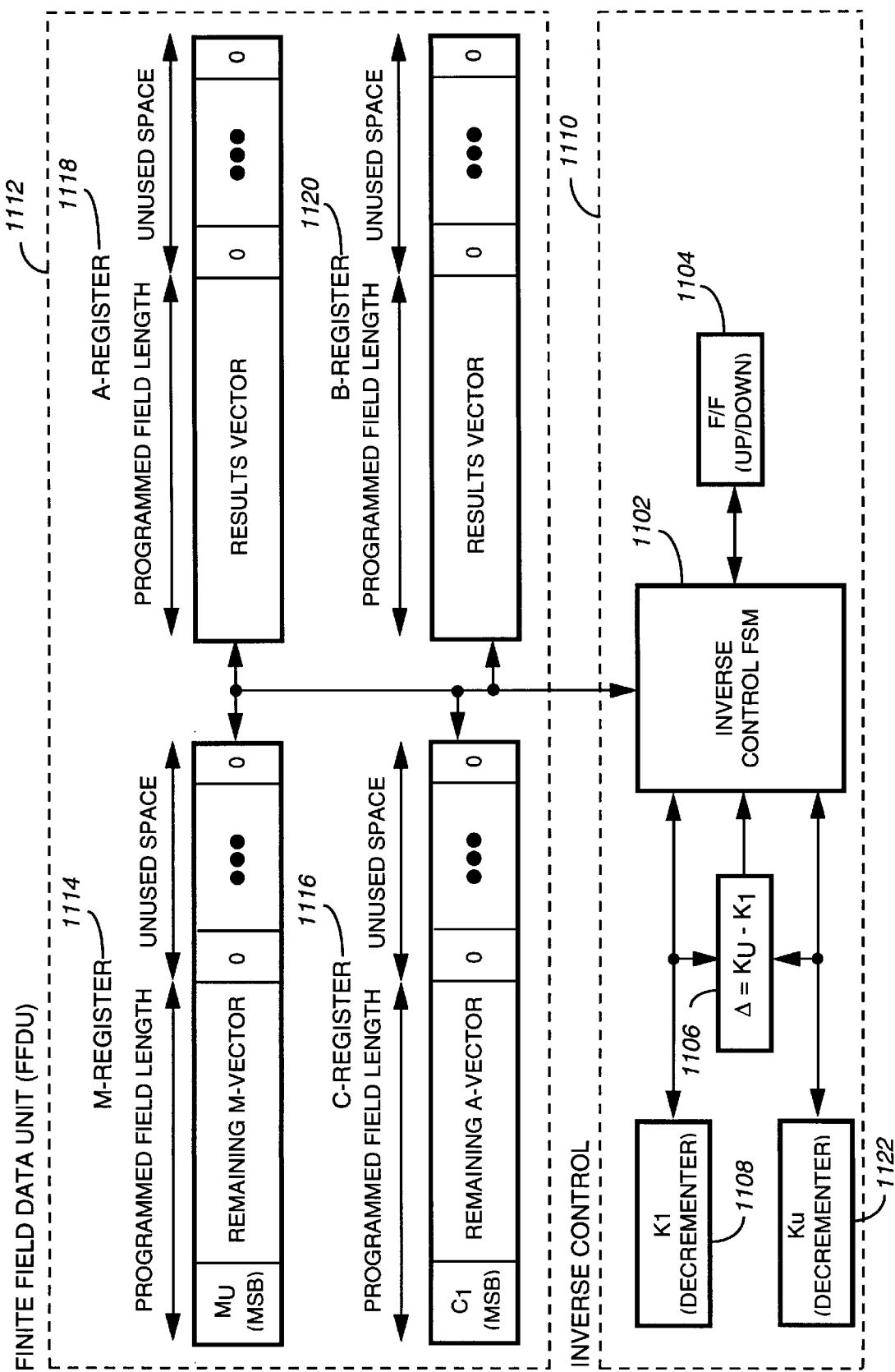
FIG. 11 is a block diagram of an architecture for use in computing finite field inverse arithmetic.

Referring to FIG. 11, the block diagram shows an architecture for use in computing finite field inverse arithmetic.

There are four registers required to perform the inverse. The register in the upper left contains "m", the irreducible polynomial 1114. The C-register, lower left 1116, contains the vector to be inverted. The registers on the right side 1118, 1120 contain intermediate and final results of the inverse.

The inverse control finite state machine 1110 is described as follows. This inverse control finite state machine 1110 essentially implements a procedure that is functionally equivalent to performing the Euclidean Algorithm. The inverse control finite state machine 1110 controls the two decrementers 1108, 1122 required of the inverse, $k_l$ 1108 and $k_u$ 1122, and uses these values in addition to their difference to control the operation of the four registers. There is also a single flip flop 1104 whose state is the status signal "U/D" (or Up/Down). This is also used by the inverse control finite state machine 1100 in determining the operation of the registers.

Before going into detail on how the state machine operates, a brief description of the clocking methodology is necessary. The state machine, as a control entity, is clocked on the rising edge of the system clock. All entities with which it communicates (e.g. registers, decrementers, "toggle", etc.) are clocked on the falling edge of the system clock. The advantage of this scheme is that it allows each state to perform an action mid-cycle (e.g. shift, add, etc.) and observe the results of this action when determining its next state. Thus, rather that using two cycles for each state (e.g. "execute" and "observe") the inverse control finite state machine 1100 uses only one.

Figure 12:
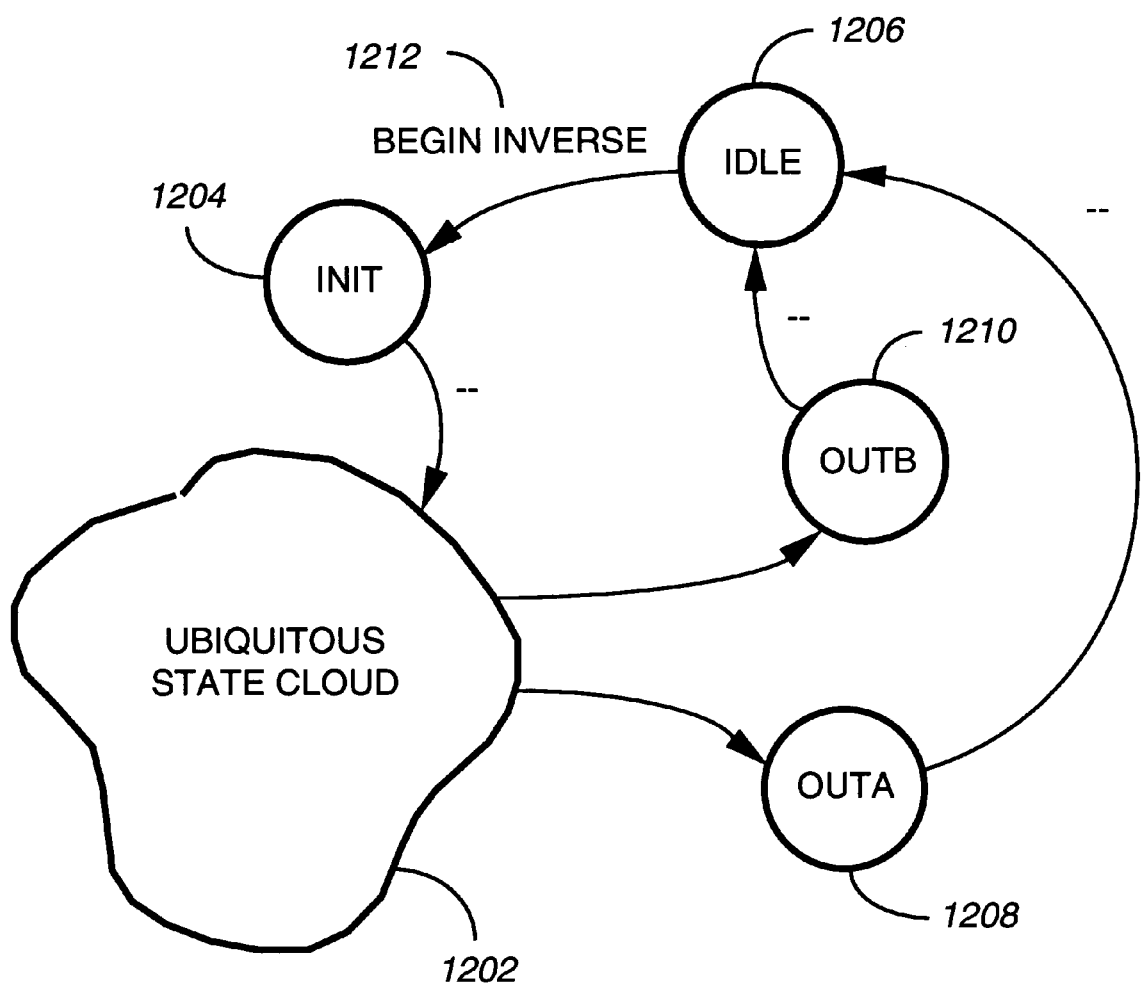
FIG. 12 is a state diagram showing an exemplary implementation of a Moore-style inverse control finite state machine.

Referring to FIG. 12, the illustration shows a state diagram of an exemplary implementation of a Moore-style inverse control finite state machine 1100.

When an inverse is initiated, the following pre-conditions are assumed to be met before this operation can be run successfully: (1) the irreducible polynomial is loaded in the M-register (left justified), (2) the field element to be inverted is loaded in the C-register (left justified), and (3) a single "1" is loaded in the LSB bit of the "active" B-register; that is, the first valid position to the left of the zero-padded/unused portion of the register is set to a "1".

When initiated, the inverse control finite state machine 1100 enters its Init state 1204. At this time, the A 1118 and Toggle registers are cleared and both decrementers are initialized to the size of the irreducible polynomial (i.e., the field size +1).

Once this is accomplished, the inverse control finite state machine 1100 enters the "Ubiquitous State Cloud" 1202. This "cloud" contains most of the remaining states. Each state action is shown in the TABLE 2 below.

TABLE 3

| State | Action(s) | | |
|---|---|---|---|
| Idle | no action | | |
| Init | clear A and Toggle registers, load decrementers (ku And kl) | | |
| State 1 | decku, | lsM, | lsA |
| State 2 | decku, | lsM, | lsA, toggle |
| State 3 | decku, | lsM, | rsB |
| State 4 | deckl, | lsC, | lsB |
| State 5 | deckl, | lsC, | lsB, toggle |
| State 6 | deckl, | lsC, | rsA |
| State 7 | deckl, | Dadd-lsC, | Dadd-lsB, toggle |
| State 8 | deckl, | Dadd-lsC, | Dadd-rsA |
| State 9 | decku, | Uadd-lsM, | Uadd-lsA, toggle |
| State 10 | decku, | Uadd-lsM, | Uadd-rsB |
| OutB | places inverse results in C register and irreducible polynomial in M register | | |
| OutA | places inverse results in C register and irreducible polynomial in M register | | |

The following table a list of input signal definitions:

TABLE 4

| Inputs | Description |
|---|---|
| U/D | output of the Up/Down register |
| ku | value of this ku decrementer |
| kl | value of this kl decrementer |
| Δ | value of (ku-kl) |
| mu | msb of the M register |
| ml | msb of the C register |

By inspection of the following following code listing, one of ordinary skill in the art can see that several states have identical exit conditions which may lead to any other state.

```
from any "cloud" state (i.e. States 1–10) do
    if ku = 0 then
        enter OutB
    else if kl = 0
        enter OutA
    else
        if mu = 0 then
            if U/D = 0 then
                enter State 1
            else
                if D = 0 then
                    enter State 2
                else
                    enter state 3
                end
            end
        else if ml = 0 then
            if U/D = 1 then
                enter State 4
            else
                if D = 0 then
                    enter State 5
                else
                    enter State 6
                end
            end
        else
            if U/D = 0
                if D = 0
                    enter State 7
                else
                    enter State 8
                end
            else
                if D = 0
                    enter State 9
                else
                    enter State 10
                end
            end
        end
    end
end
```

TABLE 4 is a description of the state outputs as described above. Any differences between this table and TABLE 1 are due to implementation specific requirements introduced by the actual hardware design.

The first column shows the desired action that a given state may perform. Column two gives a brief description of the action and its sequencing (where appropriate):

TABLE 5

| Action | Description |
|---|---|
| deck$_u$ | decrement the ku counter |
| deck$_l$ | decrement the kl counter |
| lsM | left-shift the M register |
| lsC | left-shift the C register |
| lsA | left-shift the A register |
| rsA | right-shift the A register |
| lsB | left-shift the B register |
| rsB | right-shift the B register |
| Dadd-lsC | add M with C and place the left shifted results in C (M stays the same); |
| Uadd-lsM | add M with C and place the left shifted results in M (C stays the same); |
| Dadd-rsA | add A (pre-shifted) with B and place the results in B; right-shift A; |
| Dadd-lsB | add A with B and place the left-shifted results in B; |
| Uadd-lsA | add A with B and place the left-shifted results in A; |
| Uadd-rsB | add A with B (pre-shifted) and place results in A; right-shift B; |
| toggle | toggle the Up/Down register (i.e. Up->Down or Down->Up) |

Once any of the "cloud" state's exit conditions are true to either the OutB 1210 or OutA 1208 states, the inverse processing is nearly over. A transition to OutB 1210 indicates that the inverse results are contained in the B-register 1120. In addition, following a shift right in the A-register 1118, the irreducible polynomial can be found in that register. The converse is true for the OutA 1208 state.

Some important points regarding the present invention are as follows.

First, the hardware is designed such that each action and response for any "cloud" state takes exactly one clock cycle. As a result, the total number of cycles in the "cloud" states is 2n, where n is the field size. The total execution time is then (2n+2), where the two additional cycles are Init and Out. Finite field inverse is critical to the elliptic curve cryptosystem and therefore improvements such as realized in the present invention have a direct, noticeable impact on overall performance.

Second, this circuit has considerable flexibility. The registers A, B, M, and C are preferably each 256 bits wide. Thus, inversions of up to 256 bits are supported. However, the circuit is flexible enough to handle inversions less than 256 bits, in increments of 1, or greater if the register length is extended.

Third, feedback from the FFDU 1112 to the inverse control finite state machine 1100 (mu and ml) is minimal and the signals come from fixed points within the FFDU 1112.

Fourth, the irreducible polynomial is preserved upon the completion of the inverse.

And last, the state transition equations from all of the "cloud" states are identical.

While the invention has been described in connection with a specific embodiment thereof and in a specific use, various modifications thereof will occur to those skilled in the art without departing from the spirit of the invention. For example it may be noted that in the embodiments described, reference is made to specific logic circuits, however equivalent circuits may be used, for example by using de Morgans Rule or if inverted logic is implemented then complementary circuits may be used. In addition, when referring to the orientation of the registers and bit vectors, i.e., left, right, top, bottom, other arrangements of these directions are also implied.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

We claim:

1. A finite field inverse circuit, comprising:
   a finite field data unit; and
   an inverse control unit coupled to the finite field data unit, the inverse control unit comprising:
   a kl and ku decrementer pair;
   a $k_l$-$k_u$ difference unit coupled to the $k_l$ and $k_u$ decrementer pair;
   an inverse control finite state machine coupled to the $k_l$ and $k_u$ decrementer pair and the $k_l$-$k_u$ difference unit; and
   a one-bit memory coupled to the inverse control finite state machine.

2. The finite field inverse circuit according to claim 1 wherein the inverse control finite state machine is clocked on a first edge of a system clock and the $k_l$ and $k_u$ decrementer pair, $k_l$-$k_u$ difference unit, and a one-bit memory are clocked on a second edge of the system clock, so that the inverse control finite state machine can observe any results coupled from the $k_l$ and $k_u$ decrementer pair, $k_l$-$k_u$ difference unit, and a one-bit memory before determining a next transition state, thus performing a complete inverse action in one cycle of the system clock.

3. The finite field inverse circuit according to claim 2 wherein the first edge of a system clock is a rising edge and the second edge of the system clock is a falling edge.

4. The finite field inverse circuit according to claim 2 wherein the first edge of a system clock is a falling edge and the second edge of the system clock is a rising edge.

5. The finite field inverse circuit according to claim 2 wherein a field element is inverted in 2n+2 system clock cycles where n is a field size associated with the field element.

6. The finite field inverse circuit according to claim 1 wherein the finite field data unit comprises m bit wide registers.

7. The finite field inverse circuit according to claim 6 wherein m is 256 bits.

8. The finite field inverse circuit according to claim 6 wherein the finite field data unit comprises four m bit wide registers.

9. The finite field inverse circuit according to claim 8 wherein the wherein the four m bit wide registers are shift registers designated as B, A, M, and C, where B- is a first register, A- is a second register, M- is a irreducible polynomial register, and C- is a field element register.

10. The finite field inverse circuit according to claim 8 wherein initialization of the inverse control unit requires that:
    an irreducible polynomial be loaded left justified in the M-register;
    a field element to be inverted is loaded left justified in the C-register, and
    a single "1" is loaded in an LSB bit of the B-register.

11. The finite field inverse circuit according to claim 10 wherein the inverse control finite state machine is clocked on a first edge of a system clock and the $k_l$ and $k_u$ decrementer pair, $k_l$-$k_u$ difference unit, and a one-bit memory are clocked on a second edge of the system clock, so that the inverse control finite state machine can observe any results coupled from the $k_l$ and $k_u$ decrementer pair, $k_l$-$k_u$ difference unit, and a one-bit memory before determining a next transition state, thus performing a complete inverse action in one cycle of the system clock.

12. The finite field inverse circuit according to claim 11 wherein the first edge of a system clock is a rising edge and the second edge of the system clock is a falling edge.

13. The finite field inverse circuit according to claim 12 wherein the first edge of a system clock is a falling edge and the second edge of the system clock is a rising edge.

14. The finite field inverse circuit according to claim 12 wherein a field element is inverted in 2n+2 system clock cycles where n is a field size associated with the field element.

* * * * *